June 19, 1956  D. H. BOND  2,750,963
CONCENTRIC PIPE INSULATOR AND SPACER
Filed May 15, 1952  3 Sheets-Sheet 1
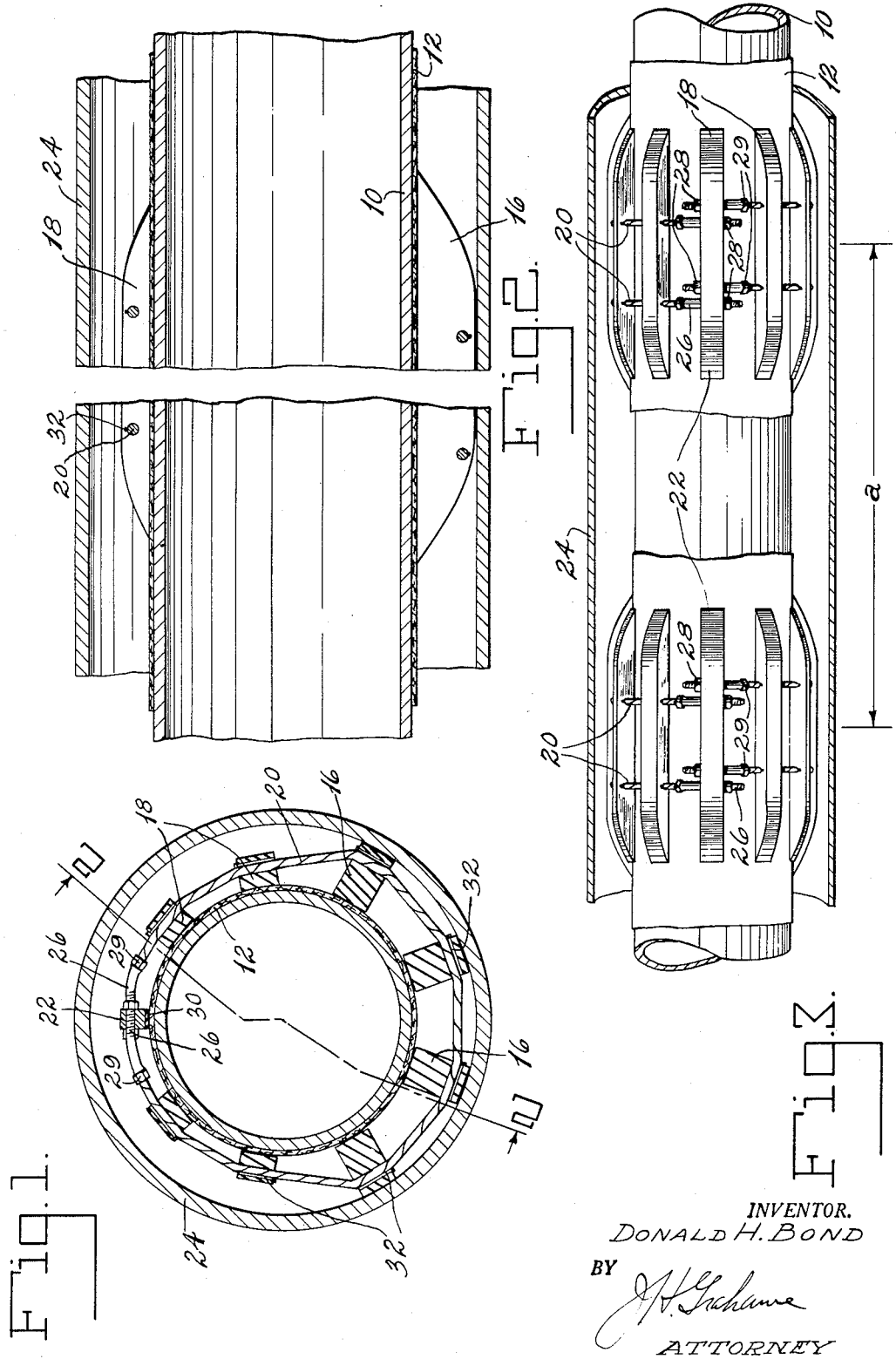
INVENTOR.
DONALD H. BOND
BY
*J. H. Grahame*
ATTORNEY June 19, 1956  D. H. BOND  2,750,963
CONCENTRIC PIPE INSULATOR AND SPACER
Filed May 15, 1952  3 Sheets-Sheet 2
Fig.4.
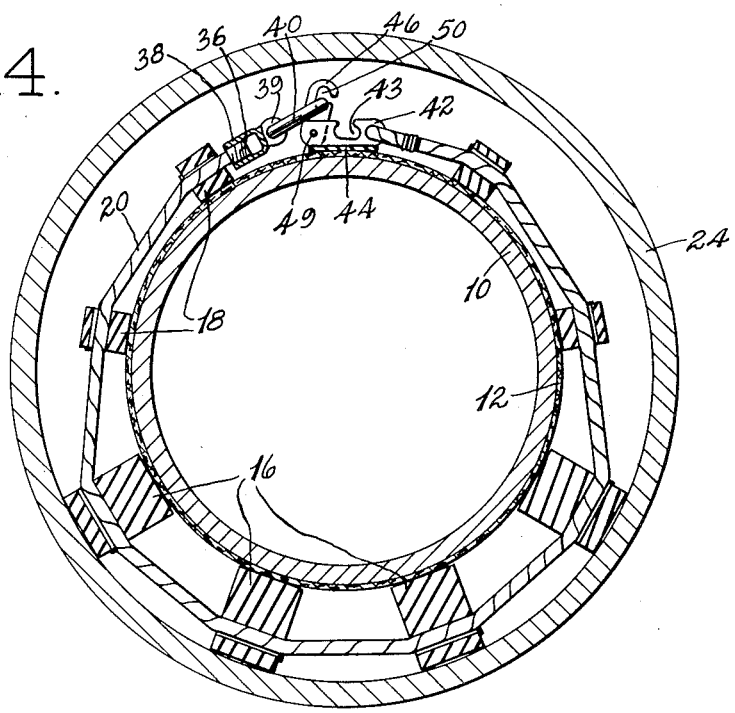
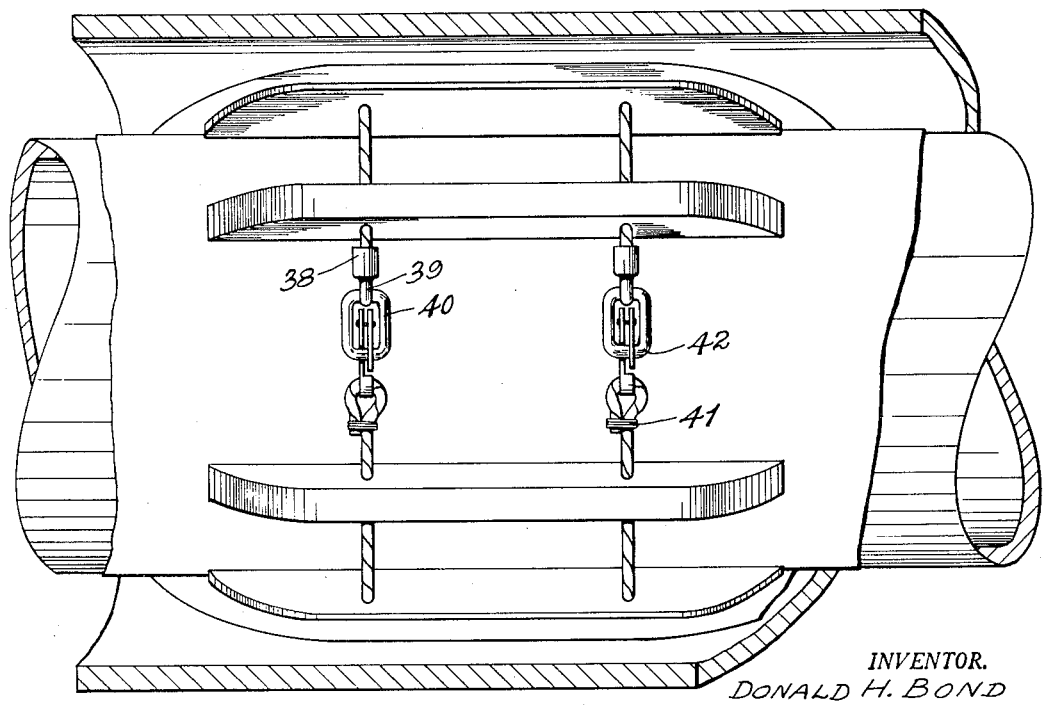
Fig.5.
INVENTOR.
DONALD H. BOND
BY
ATTORNEY

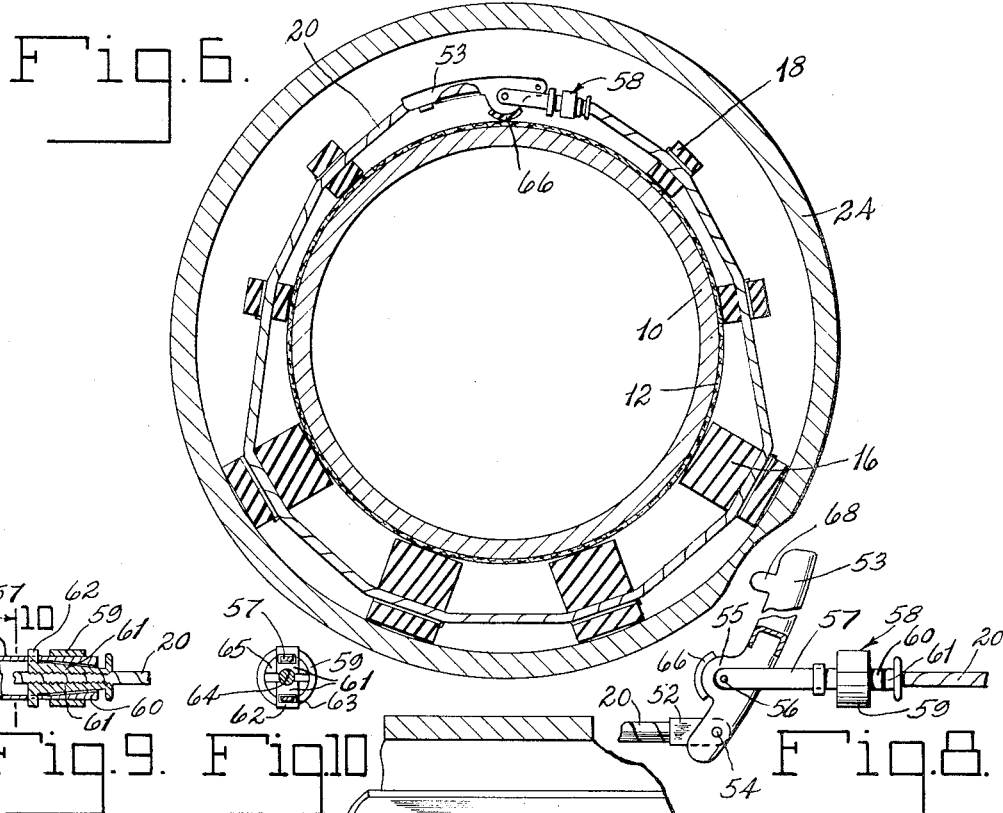
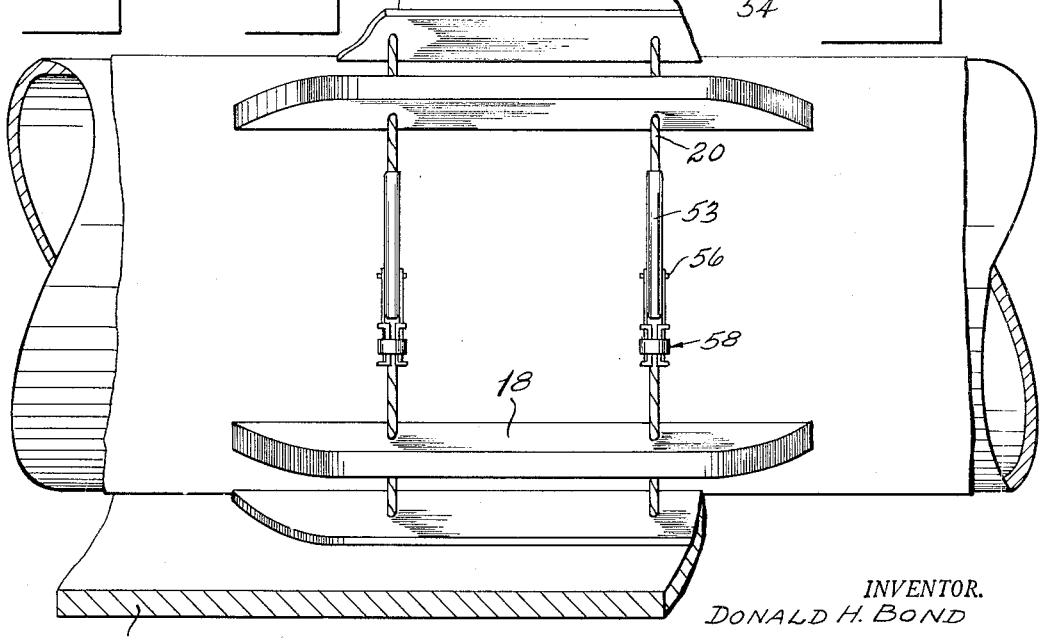

United States Patent Office 2,750,963
Patented June 19, 1956

2,750,963

CONCENTRIC PIPE INSULATOR AND SPACER

Donald H. Bond, Houston, Tex., assignor, by mesne assignments, to The Texas Pipe Line Company, Houston, Tex., a corporation of Texas Application May 15, 1952, Serial No. 287,998

3 Claims. (Cl. 138—65)

The present invention relates to a pipe insulating device and more particularly to devices for electrically insulating and spacing one pipe concentrically within another pipe.

The present invention concerns an improvement upon the invention disclosed in my earlier Patent No. 2,551,867 wherein a series of insulated spacers space and center one pipe within another while providing a minimum of frictional resistance when one pipe is moved into position within the other. To this end, a plurality of elongated spacer members, disposed parallel to and in separated relation about the inner pipe comprise a material having high dielectric and mechanical strength and low moisture absorption properties, are rigidly clamped to the inner pipe by elongated tensioning means disposed laterally through said members about the inner pipe and oppositely tensioned at their extremities to cause each of the members to grip the pipe.

In accordance with the present invention, the elongated tensioning elements are tensioned at their extremities without the imposition of twisting strains. For example, said extremities may pass oppositely and laterally through a bar arranged parallel to the inner pipe and be tensioned against the opposite faces of said bar by means of nuts or other rotatable tightening means, in which case the tensioning element is provided near its extremities with an engageable portion such as polygonally arranged surfaces adapted to be gripped by a wrench or similar device to avoid rotating the extremity as the nut is tightened. Also, it is contemplated providing said extremities of the elongated tensioning element with interengageable, toggle type tensioning means to draw the extremities together in a circumferential direction, thus stressing or tensioning the element in a longitudinal direction excusively. Adjustable means is also provided to vary the effective length of the tensioning element and thus adapt the device to pipes of different circumference.

For the better understanding of the present invention, reference is made to the accompanying drawing in which Fig. 1 is a cross section through a group of spacer members disposed between an inner pipe and its outer casing; Fig. 2 is a longitudinal cross section on the line 2—2 of Fig. 1; Fig. 3 is a longitudinal view partly in section showing two groups of the spacer members in place; Fig. 4 is a view similar to Fig. 1 showing a modified construction; Fig. 5 is a longitudinal view partly in section of the embodiment of Fig. 4; Figs. 6 and 7 are views similar to Figs. 4 and 5 of a modified embodiment; Figs. 8 and 9 are detailed views of the tensioning device of Figs. 6 and 7; and Fig. 10 is a sectional view taken on the line 10—10 of Fig. 9.

Referring to the drawing, pipe 10 is a portion of an oil pipe line, for example, coated with a layer 12 of a material such as asphaltum and/or kraft paper, layers of fiber glass or any other suitable material.

At desired intervals throughout the length of the pipe, groups or sets of insulating or spacing members 16 and 18 are arranged as shown. Each of the members 16 and 18 is formed of a bar or length of material having a high dielectric and mechanical strength and low moisture properties, such as, for example, the phenolic condensation product Bakelite. As indicated, the bars or members 16 and 18 are preferably square or rectangular in cross section and preferably elongated relative to their transverse dimension. They are arranged about the surface of the inner pipe parallel to the axis thereof in peripherally spaced relationship.

The members 16 and 18 are, in turn, rigidly clamped in gripping relationship to the surface of the inner pipe 10 by means of elongated connecting elements comprising paired stranded steel cables 20, which pass laterally through laterally extending apertures in the members 16 and 18. Instead of the stranded steel cable, wire, flexible metal bars, strips or rods, or any other suitable elongated metallic elements may be employed. In the embodiment shown in Figs. 1–3, an additional bar or member 22 extending parallel to the spacing elements 18 is provided with four holes adapted to accommodate the extremities of the respective tensioning cables which extend oppositely through the bar. The extremities of the cables 20 are provided with threaded extensions, fittings, studs or caps 26 receiving nuts 28 which coact with the opposite faces of the bar. The fittings 26 are permanently secured to the ends of the cable by swaging, molding, welding, or otherwise. Therefore, drawing up upon the nuts 28 serves to tension the cable 20 throughout its length, fixedly gripping the insulating members against the inner pipe while holding the cable 20 spaced from the pipe around its entire circumference.

The fittings or studs 26 are provided at a point spaced from their threaded extremities with engageable surfaces 29 such as wrench flats disposed polygonally about the longitudinal axis of cable 20 and adapted to receive gripping means such as a wrench to hold the fitting against rotation as the nut 28 is tightened. As shown, the polygonal surfaces to be gripped may be formed upon an expanded or upset portion of the fitting. This avoids undesired twisting of the cable or tensioning element 20 tending to displace or distort the spacing members through which it passes.

When metal rods or wires or other, preferably flexible, tensioning elements are used in place of stranded steel cable, threaded studs or fittings may be applied, or the ends of the members may themselves be threaded and provided with cooperating nuts.

As will be apparent from Figs. 1–3, the assembly thus applied to the inner pipe serves to dispose it centrally and axially within an outer pipe or casing 24 which normally rests upon or is buried in the earth to protect and support the inner pipe 10. This follows from the fact that the height or dimension of each of the lower spacing members 16, which are positioned on the bottom of the pipe all on one side of a diameter, in a direction radially of the pipe 10 is substantially equal to the distance between the coating 12 and the inner surface of the casing 24. On the other hand, spacer elements 18 which are located along the upper half of the inner pipe are substantially less in height or radial dimension, affording a substantial clearance between their outer surfaces and the inner surface of the casing 24.

This is of particular advantage from the standpoint of enabling the inner pipe with the insulating and spacing assembly gripped thereabout to be pulled or forced axially into position within the outer casing 24 as shown. In other words, by virtue of the substantial clearance thus afforded, with the upper portion of casing 24, engagement with the upper portion of casing 24 and particularly with any irregularities therein is avoided. Also, each of the elements 16 and 18 is provided with arcuate extremities tapering toward the inner casing and acting in the same manner as a sled runner when the inner pipe is shifted axially. In any event, the device is sufficiently rugged to remain in gripping position upon the inner pipe without any possibility of elements 16 and 18 becoming twisted or loosened.

The tensioning bar or coupling member 22 may advantageously be formed of a somewhat stronger and more rigid material than the dielectric material of the spacers 16 and 18, in order to maximize permissible tensioning stresses in the tensioning elements 20. For example, as shown in Figs. 1 and 2, the member 22 may be formed of steel provided with a suitable layer of dielectric material such as rubber or Bakelite integrally affixed to its inner surface as at 30. Obviously, this spaces the conductive material from the surface of the pipe 10 in electrically insulating relationship.

Also, it is preferred to fix the spacing members 16 and 18 upon the tensioning element or cable 20 at the predetermined intervals shown by means of retaining pins 32 driven alongside the tensioning cable where it passes through the spacing members 16 and 18 to wedge the cable against the spacer members. Alternatively, the spacing members may be molded about cables or forced thereon or may be provided with molded inserts to which the tensioning elements join on opposite lateral sides of the members.

Accordingly, the outer and inner pipe are electrically insulated from one another throughout their lengths, and it is therefore possible to greatly reduce the power requirements when cathodic protection is applied to the pipe line for preventing corrosion thereof.

Referring to the embodiment of Figs. 4 and 5, a threaded cap or fitting 36 is swaged or welded to one end of cable 20 and receives a mating, internally threaded fitting 38. The fitting 38 is provided with an eye portion 39 pivotally receiving a link or ring 40.

The opposite extremity of the cable is permanently fastened as at 41 to a block 42 recessed as at 43, and provided at its lower surface with a layer of dielectric material 44 to electrically insulate the assembly from inner pipe 10. A toggle lever 46 is pivoted to the block 42 as at 49, and is recessed as at 50 to receive the ring 40, the recess, in general, corresponding to the aforementioned recess 43 when the lever 46 is in a down position.

Therefore, to tension the cable 20 the ring or link 40 is passed over the toggle lever 46 to engage the recess 50; the lever is then actuated about pivot 49 in a clockwise direction, as viewed in the figure where it parallels block or member 42. As the lever is actuated the cable ends are accordingly drawn together and tensioned, the lever remaining in the position indicated in Fig. 5 by virtue of the fact that the tension through the link 40 at that time acts on or below the center of the pivot point 49. The threaded interengagement between the fittings 36 and 38 as aforementioned is of special advantage in enabling adjustment of the final tension in the cable 20 by affording substantial adjustment of the position of the cap 38 upon the fitting 36. For example, prior to engaging the ring 40 with the toggle lever 46, the cap 38 and the link 40 associated therewith may be rotationally adjusted to the desired position with respect to the longitudinal axis of the cable 20. This, in reality, lengthens or shortens the effective length of the cable, as the case may be, and obviously adapts the device to pipes of somewhat different circumferential dimension. The assembly, therefore, comprises a toggle tensioning means associated with the extremities of each cable and interengageable to draw the extremities of the cable together and lock them together, associated with means for adjusting the effective length of the cable.

A somewhat modified type of tensioning arrangement is illustrated in Figs. 6–10 wherein the left extremity of the cable 20 as viewed in Figs. 6 and 8 is provided with a swaged or welded fitting 52 pivoted to a toggle lever 53. The lever 53 shown in the drawing is formed of sheet metal formed to a U or channel shaped cross section as indicated to embrace the fitting 52 and the cable in closed position. The lever 53 is pivoted to the fitting 52 by means of a pin or pivot 54 on the side flanges of the channel section. Accordingly, the upper extremity of the lever 53 as viewed in Fig. 8 is engageable manually or by any suitable tool for actuating it about the pivot 54 to the position shown in Figs. 6 and 7.

Extensions 55 upon the side flanges of the lever 53 are respectively pivoted at 56 to spaced, parallel, extensions or bars 57 of cable gripping device 58.

The cable gripping means 58, as shown more specifically in Figs. 8–10 comprises a ring or collar 59. The extensions or bars 57 project into the collar 59 in opposed relation as shown in Figs. 9 and 10, and are welded to the inner surface thereof.

Where they pass through the collar 59, the strips or bars 57 are wedge-shaped in longitudinal section as at 60 to provide surfaces which incline axially inwardly of collar 59. Cable grips 61, slidable axially upon these inclined surfaces, are provided with corresponding axially inclined outer surfaces as shown. The cable grips 61 are guided for axial movement relative to the collar by means of outwardly projecting flanges 62, apertured as at 63 to embrace the bars 57.

The cable grips as more specifically shown in Fig. 10 are provided with arcuate gripping surfaces 64 which are preferably serrated or roughened to grip the cable.

Therefore, when the end of cable 20 is inserted between the grips 61 and tension applied, the grips are drawn to the right as viewed in Figs. 8 and 9, and forced together, firmly clamping the cable extremity against slippage.

Thus, after the spacer members have been applied about the inner pipe, the extremity of the cable is passed between the grips 61 to the desired position and the toggle lever 53 actuated from the position shown in Fig. 8 into its final position shown in Figs. 6 and 7, to draw up upon the extremities of the cable and firmly tension it in the position shown. The channel cross section of the lever 53, as aforementioned, enables it to embrace the cable as shown in Fig. 6. In this position, the cable acts upon fulcrum 56 through a line below pivot 54. Therefore, the toggle tends to remain positively locked in the operating position shown.

Obviously, as in the preceding embodiment, the tension acting upon the cable is determined by the position at which the cable gripping means is engaged with the cable before actuating the toggle lever 53.

It is also contemplated insulating the tensioning means from the surface of the inner pipe by means of dielectric or insulating strips 66 cemented or otherwise integrally fastened to the lower edges of extensions or ears 55. Likewise, it is contemplated providing a deformable projecting tab or ear 68 upon one side flange of the lever 53. The tab 68 may be bent or turned over to the final position shown in Fig. 6 to close the lower face of the channel and positively prevent release or opening of the toggle.

Preferably, inserts 65, as in Fig. 10, are welded to the interior of collar 59 to provide guideways for cable grips 61.

Accordingly, therefore, the present invention provides effective means for quickly applying the pipe supporting insulating assembly and for adjusting the gripping and tensioning elements to any desired, predetermined tension.

Obviously, many modifications and variations of the above invention as hereinbefore set forth may be made without departing from the spirit and scope thereof, therefore, only such limitations should be imposed as are indicated in the appended claims.

I claim:
1. In combination, an outer casing; an inner pipe within said casing spaced annularly from the inner wall thereof; and a pipe spacing device carried by said inner pipe designed for maintaining said annularly spaced relationship, said device comprising a plurality of elongated parallel spaced pipe spacer members formed of electrically insulating material and having apertures extending laterally therethrough, several of said spacer members having a height substantially equal to the space between the bottom surface of said pipe and the inner surface of said casing, said last named members all being positioned on the bottom of said pipe, the rest of said spacer members having a lesser height so as to provide clearance between said casing and said pipe carrying said spacer members, said device also including a coupling member comprising a metallic bar arranged parallel to said spacer members and having a layer of electrically insulating material on the inner surface thereof insulating said bar from said pipe, said device also including connecting means securing said members in spaced relation about the periphery of said pipe, said connecting means comprising at least one elongated metallic connecting element passing laterally through said apertures in said spacer members in position to be spaced from the surface of such a pipe by all of said spacer members, and having extremities extending oppositely through said metallic bar, and means coacting with said extremities and the opposite faces of said bar for developing tension in said connecting element to hold said spacer members on said pipe; and retaining pins in said apertures wedging said connecting element against said spacer members for securing said members in fixed spaced relation on said connecting element.

2. A pipe spacing device designed for maintaining an inner pipe in annularly spaced relation to the inner wall of a surrounding casing, said device comprising a plurality of elongated parallel spaced pipe spacer members formed of electrically insulating material and having apertures extending laterally therethrough, several of said spacer members having a height substantially equal to the space between the outer surface of said pipe and the inner surface of said casing, said last named members all being so positioned as to lie on one side of a diameter of said pipe when secured thereon, the rest of said spacer members having a lesser height so as to provide clearance between said casing and said pipe carrying said spacer members; a coupling member comprising a metallic bar arranged parallel to said spacer members and having a layer of electrically insulating material on the inner surface thereof for insulating said bar from said pipe; connecting means for securing said members in spaced relation about the periphery of said pipe, said connecting means comprising at least one elongated metallic connecting element passing laterally through said apertures in said spacer members in position to be spaced from the surface of said pipe by all of said spacer members, and having extremities extending oppositely through said metallic bar, and means coacting with said extremities and the opposite faces of said bar for developing tension in said connecting element to hold said spacer members on a pipe; and retaining pins in said apertures wedging said connecting element against said spacer members for securing said members in fixed spaced relation on said connecting element.

3. A pipe spacing device designed for maintaining an inner pipe in annularly spaced relation to the inner wall of a surrounding casing, said device comprising a plurality of elongated parallel pipe spacer members formed of electrically insulating material and having apertures extending laterally therethrough; a coupling member comprising a metallic bar arranged parallel to said spacer members and having a layer of electrically insulating material on the inner surface thereof for insulating said bar from said pipe; at least one elongated metallic connecting element passing laterally through said apertures in said spacer members in position to be spaced from the surface of said pipe by all of said spacer members, and having extremities extending oppositely through said metallic bar; means coacting with said extremities and the opposite faces of said bar for developing tension in said connecting element to hold said spacer members on said pipe; and retaining pins in said apertures wedging said connecting element against said spacer members for securing said members in fixed spaced relation on said connecting element.

References Cited in the file of this patent
UNITED STATES PATENTS

| | | |
|---|---|---|
| 575,388 | Bowen | Jan. 19, 1897 |
| 1,122,130 | Lamson | Dec. 22, 1914 |
| 1,299,660 | Bascue | Apr. 8, 1919 |
| 2,551,867 | Bond | May 8, 1951 |

FOREIGN PATENTS

| | | |
|---|---|---|
| 781,153 | France | Feb. 18, 1935 |